(12) United States Patent
Hofmann et al.

(10) Patent No.: US 11,333,187 B2
(45) Date of Patent: May 17, 2022

(54) SELF-PIERCING RIVET AND SELF-PIERCING RIVETING METHOD AND SELF-PIERCING RIVETED JOINT

(71) Applicant: NEWFREY LLC, New Britain, CT (US)

(72) Inventors: Steffen Hofmann, Giessen (DE); Paul Bartig, Giessen (DE); Frank Wilhelm, Giessen (DE); Matthias Wissling, Giessen (DE)

(73) Assignee: NEWFREY LLC, New Britain, CT (US)

( * ) Notice: Subject to any disclaimer, the term of this patent is extended or adjusted under 35 U.S.C. 154(b) by 323 days.

(21) Appl. No.: 16/733,445

(22) Filed: Jan. 3, 2020

(65) Prior Publication Data

US 2020/0141439 A1 May 7, 2020

Related U.S. Application Data

(63) Continuation of application No. 15/797,636, filed on Oct. 30, 2017, now Pat. No. 10,550,873, which is a
(Continued)

(30) Foreign Application Priority Data

Dec. 11, 2013 (DE) .................. 102013020504.2

(51) Int. Cl.
*F16B 19/08* (2006.01)
*B21J 15/02* (2006.01)
*F16B 5/04* (2006.01)

(52) U.S. Cl.
CPC ........... *F16B 19/086* (2013.01); *B21J 15/025* (2013.01); *F16B 5/04* (2013.01)

(58) Field of Classification Search
CPC .......... F16B 5/04; F16B 19/08; F16B 19/083; F16B 19/086; B21J 15/025; B21J 15/046
See application file for complete search history.

(56) References Cited

U.S. PATENT DOCUMENTS

| 5,359,765 A | 11/1994 | Auriol et al. |
| 6,263,560 B1 | 7/2001 | Edwards |
| (Continued) | | |

FOREIGN PATENT DOCUMENTS

| DE | 102006039718 | 4/2007 |
| EP | 0833063 | 7/2002 |
| (Continued) | | |

OTHER PUBLICATIONS

Translation of WO 2006/087984A1 to Kamata, Akira; translated by Michael Landay; 22 pgs (Year: 2018).*
(Continued)

*Primary Examiner* — Daniel J Wiley
(74) *Attorney, Agent, or Firm* — Pillsbury Winthrop Shaw Pittman LLP

(57) ABSTRACT

A riveted joint comprising: an upper workpiece and a lower workpiece, and a self-piercing rivet. The rivet in an undeformed state, before the creation of the riveted joint, included: a head defining a head diameter (DH); a shank defining a shank diameter (DS); and a foot end opposite the head. Radially outward at the foot end is a flat surface facing away from the head; and an axial recess located radially inward of the flat surface, partly defined in the foot end, open axially away from the head, and frustoconical in longitudinal cross section. The axial recess defining an axial depth (LB). The ratio of recess axial depth (LB) to shank diameter (DS) is less than 0.3. And in a deformed state, after the creation of the riveted joint, the rivet extends through the
(Continued)

first workpiece and penetrates the second workpiece; and the head bears against the upper surface.

18 Claims, 2 Drawing Sheets

Related U.S. Application Data continuation of application No. 15/179,391, filed on Jun. 10, 2016, now Pat. No. 9,803,675, which is a continuation of application No. PCT/EP2014/072452, filed on Oct. 20, 2014.

(56) References Cited

U.S. PATENT DOCUMENTS

| | | | |
|---|---|---|---|
| 6,325,584 B1 * | 12/2001 | Marko | B21J 15/025 411/179 |
| 6,732,420 B2 | 5/2004 | Wang et al. | |
| 6,988,862 B1 | 1/2006 | Iguchi et al. | |
| 7,377,021 B2 | 5/2008 | Mauermann et al. | |
| 7,628,573 B2 | 12/2009 | Philipskotter et al. | |
| 7,762,753 B2 | 7/2010 | Jokisch | |
| 8,070,406 B2 | 12/2011 | Trinick | |
| 8,506,228 B2 | 8/2013 | Singh et al. | |
| 8,763,233 B2 | 7/2014 | Bartig | |
| 9,803,675 B2 | 10/2017 | Hofmann et al. | |
| 10,465,730 B2 | 11/2019 | Hofmann et al. | |
| 2004/0068854 A1 | 4/2004 | Kato et al. | |
| 2009/0269165 A1 | 10/2009 | Fujii et al. | |
| 2013/0336745 A1 | 12/2013 | Trinick et al. | |
| 2018/0045237 A1 | 2/2018 | Hofmann et al. | |

FOREIGN PATENT DOCUMENTS

| | | |
|---|---|---|
| EP | 1229254 | 8/2002 |
| EP | 2080915 | 7/2009 |
| EP | 2314890 | 4/2011 |
| JP | H09-317730 | 12/1997 |
| JP | 2009-541057 | 11/2009 |
| TW | 200641261 | 12/2006 |
| WO | 97/22810 | 6/1997 |
| WO | 2006/087984 | 8/2006 |
| WO | 2007/132194 | 11/2007 |
| WO | 2015/086203 | 6/2015 |

OTHER PUBLICATIONS

Translation of PhD Thesis "Laboruntersuchung zur Prozessstabilitat beim Niet-Clinchen" by Reinstettel, Marc; translated by Heather O'Donovan, 6 pgs (Year: 2018).*
Translation of EP 1229254B1 to Klaus, Dehike; translated by Alison Penfold; 12 pgs (Year: 2018).*
Translation of H09-317730 to Nozaki, Yukio, et al.; translated by Michael Landay; 19 pgs (Year: 2018).*
Examination Report issued in corresponding European Patent Application No. 14786216.3, dated May 4, 2020.
English Translation of Rejection Decision issued in corresponding Chinese Patent Application No. 201480075238.9, dated Jan. 30, 2019.
English Translation of Notification of Reexamination issued in corresponding Chinese Patent Application No. 201480075238.9, dated May 14, 2020.
PR Petition Review No. 2019-00269 (of U.S. Pat. No. 9,803,675) filed Nov. 12, 2018.
English translation of M. Reinstettel, "Laboruntersuchung zur Prozessstabilitat beim Niet-Clinchen," PhD Thesis, pp. 81-85, dated Sep. 11, 2018 (Exhibit 1009 of IPR2019-00269 filed Nov. 12, 2018).
R. Todd, et al., "Manufacturing Processes Reference Guide," Industrial Press Inc. 1994, pp. 43-48, 1994 (Exhibit 1011 of IPR2019-00269 filed Nov. 12, 2018).
Declaration of P.K. Mallick, Ph.D., P.E., dated Nov. 7, 2018 (Exhibit 1012 of IPR2019-00269 filed Nov. 12, 2018).
Curriculum Vitae of P.K. Mallick, Ph.D., P.E., 2018, (Exhibit 1013 of IPR2019-00269 filed Nov. 12, 2018).
Declaration of Adam Holden Rosenberg, dated Sep. 4, 2018 (Exhibit 1014 of IPR2019-00269 filed Nov. 12, 2018).
Declaration of Rachel J. Watters, dated Aug. 30, 2018 (Exhibit 1015 of IPR2019-00269 filed Nov. 12, 2018).
M. Reinstettel, "Laboratory test for the process stability at rivetclinching," Appendix, May 13, 2008 (Exhibit 1020 of IPR2019-00269 filed Nov. 12, 2018).
Affidavit of Christopher Butler with Exhibit A, dated Sep. 11, 2018 (Exhibit 1021 of IPR2019-00269 filed Nov. 12, 2018).
Merriam-Webster's Collegiate Dictionary (11th Ed. 2007), 8 pages (Exhibit 1022 of IPR2019-00269 filed Nov. 12, 2018).
Merriam Webster Online (definition of 'frustoconical'), 1 page (Exhibit 1023 of IPR2019-00269 filed Nov. 12, 2018).
"Standard Test Method for Vickers Hardness of Metallic Materials," American Society for Testing and Materials (ASTM), Designation: E 92-82 (Reapproved 1997) (Exhibit 1024 of IPR2019-00269 filed Nov. 12, 2018).
Declaration of Angela Malz with Exhibits A, B and C, dated Nov. 7, 2018 (Exhibit 1025 of IPR2019-00269 filed Nov. 12, 2018).
EPO File History for EP Patent Application No. 14786216.3, filed Jun. 9, 2016 (National Stage of PCT/EP2014/072452 filed Oct. 20, 2014) (Exhibit 1003 of IPR2019-00269 filed Nov. 12, 2018).
M. Reinstettel, "Laboruntersuchung zur Prozessstabilitat beim Niet-Clinchen," PhD Thesis, Mar. 12, 2007, 176 pgs.
European Office Action dated Oct. 18, 2018.
Machine Translation of EP122954A2, https://worldwide.espacenet.com, generated Jun. 15, 2017 (previously cited in Parent U.S. Appl. No. 15/179,391 now U.S. Pat. No. 9,803,675).
Chinese Office Action dated Dec. 29, 2017.
JFE Steel Corporation/ ThyssenKrupp Steel "Joint Standard for Steel Slate for Automobiles", (online), p. 9, Aug. 2005 (searched on internet on May 31, 2019. URL: http://www.tks-jfe.com/downloads/20050831_tks_jfe_jp.pdf) (from Notice of Revocation received for JP Opposition No. 2019-700179, dated Jun. 10, 2019).
Nippon Steel Corporation, "A book for understanding Iron and Steel", Nippon Jitsugyo Publishing, Nov. 20, 2005, p. 32 (from Notice of Revocation received for JP Opposition No. 2019-700179, dated Jun. 10, 2019).
Wolfgang Voelkner, Frilz Liebrecht, Ortwin Hahn, Wilhelm Lappe, EFB Research Report No. 50, "Fundamental Investigations on the Suitability of Punching Riveting for Joining Aluminum Materials" (from Notice of Revocation received for JP Opposition No. 2019-700179, dated Jun. 10, 2019).
Curt D. Horvath, General Motors Corporation, "The Future Revolution in Automotive High Strength Steel Usage," www.autosteel.org, Feb. 18, 2004 (from Opposition Brief filed in JP Patent No. 6387414, dated Apr. 12, 2019).
Notice of Revocation issued in Japanese Patent No. 6387414, dated Jun. 10, 2019, including English translation.
Opposition Brief filed in Japanese Patent No. 6387414 (Opposition No. 2019-700179), dated Apr. 12, 2019.
Decision (Paper 6) instituting IPR Petition Review No. 2019-00269 (of U.S. Pat. No. 9,803,675), entered by the Patent Trial and Appeal Board dated May 16, 2019.
Non-Final Office Action issued in related U.S. Appl. No. 16/451,289, dated Sep. 17, 2019.
Notice of Allowance issued in related U.S. Appl. No. 16/451,289, dated Sep. 25, 2019.
Notification of Provisional Rejection (NPR), Non-final Office Action, issued for corresponding Korean Patent Application No. 10-2016-7016311, dated Sep. 24, 2020.

* cited by examiner

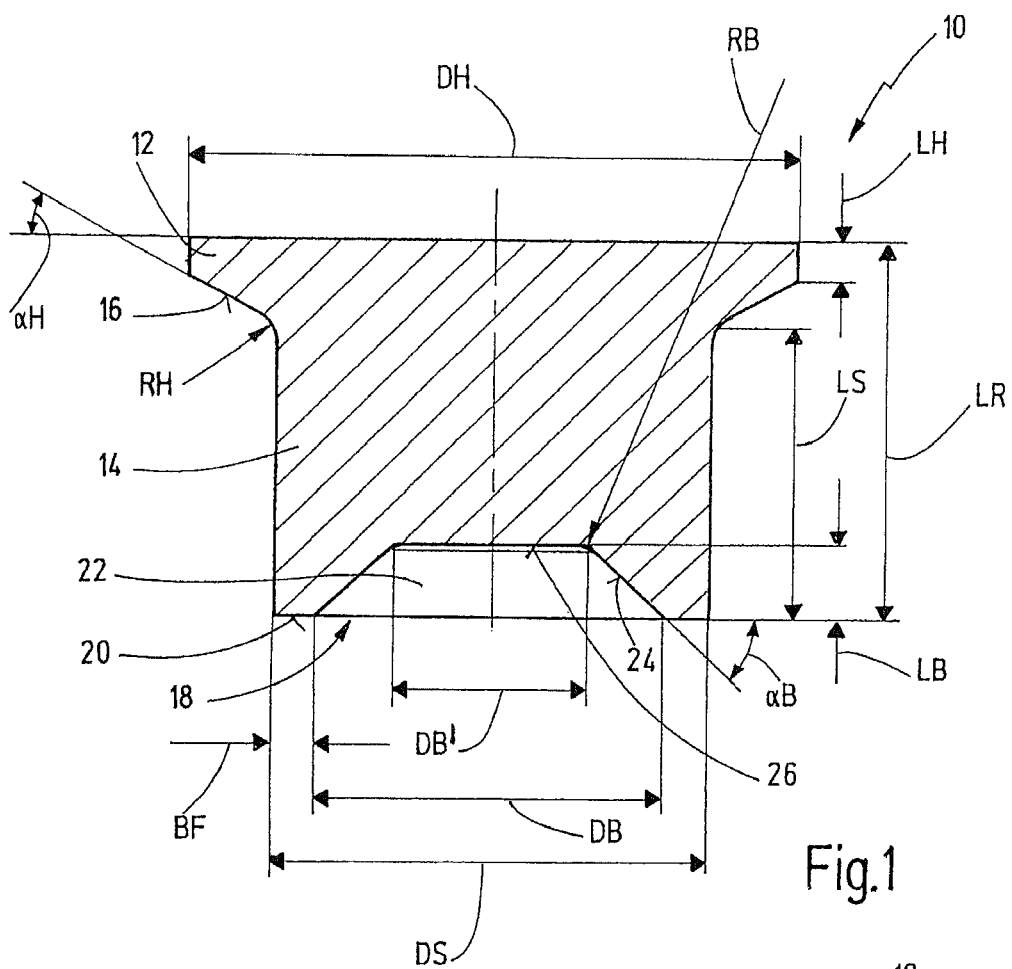
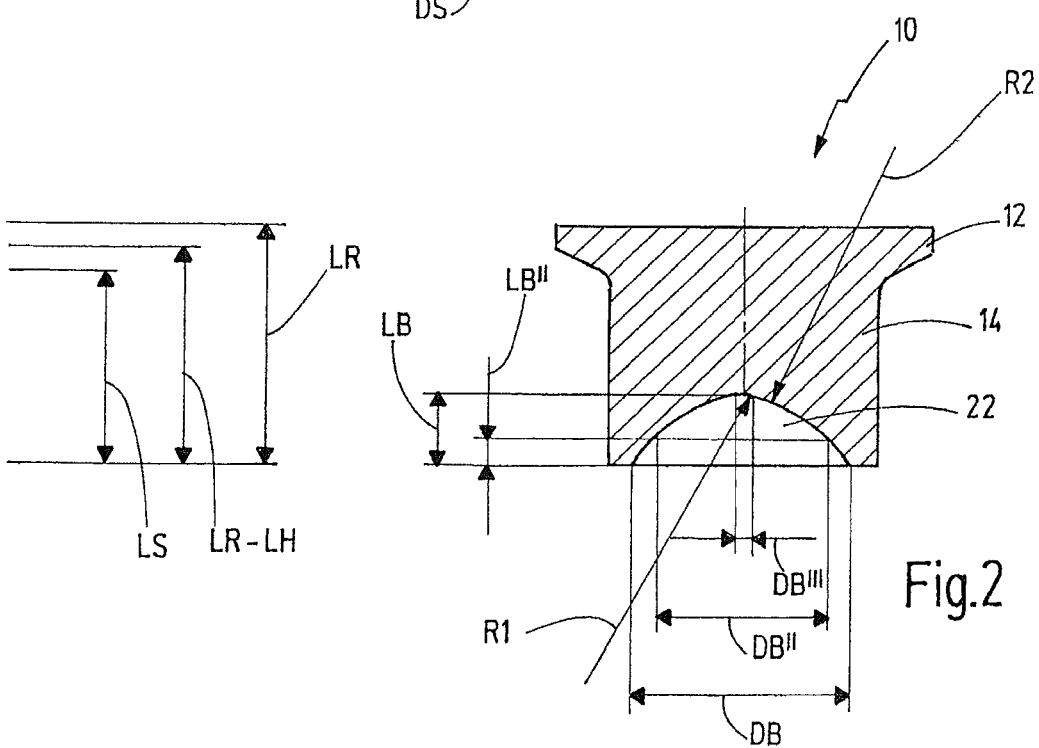
Fig.1
Fig.2

SELF-PIERCING RIVET AND SELF-PIERCING RIVETING METHOD AND SELF-PIERCING RIVETED JOINT

CROSS-REFERENCE TO RELATED APPLICATIONS

This application is a continuation of U.S. patent application Ser. No. 15/797,636, filed Oct. 30, 2017, now allowed, which is a continuation of U.S. patent application Ser. No. 15/179,391, filed Jun. 10, 2016, now U.S. Pat. No. 9,803,675, which is a continuation of international application PCT/EP2014/072452, filed Oct. 20, 2014, which claims priority from German Patent Application No. DE102013020504.2, filed Dec. 11, 2013, the disclosures of which are incorporated herein by reference in their entirety.

BACKGROUND OF THE INVENTION

The present invention relates to a self-piercing rivet for connecting high-strength steels, with a head which has a head diameter and with a shank which has a shank diameter, wherein, at the foot end opposite the head, the shank has an axial recess which has an axial depth, and wherein, at the foot end the shank has a flat surface section.

Furthermore, the present invention relates to a self-piercing riveted joint with at least one upper workpiece and one lower workpiece, of which at least one is formed from a high-strength steel, and with a deformed self-piercing rivet of the type referred to above, the head of which bears against the upper workpiece.

Finally, the present invention relates to a method for producing such a self-piercing riveted joint, with the steps of providing a workpiece arrangement which has at least one upper and one lower workpiece, and of driving a self-piercing rivet of the type referred to above into the workpiece arrangement with a punching force.

A self-piercing rivet of the form referred to above is known from EP 1 229 254 A2. In this document, it is proposed to provide a self-piercing riveted joint with at least two joining parts made of a high-strength steel, which are connected to each other by means of a semi-tubular self-piercing rivet which is formed from steel and which has a rivet head and an adjoining rivet shank with a rivet foot on the end side, wherein the rivet foot is of truncated design in the initial state before the joining operation. The shape of the self-piercing rivet is in this case intended to be identical to the shape of a self-piercing rivet as is known also for joining light metal workpieces, specifically from EP 0 833 063 A 1. The truncated design of the rivet foot is intended to achieve a favourable deformation behaviour of the semi-tubular self-piercing rivet during the joining of the high-strength joining parts, wherein the endeavour of the rivet shank to expand is reduced in comparison to a pointed rivet foot. The expansion here is intended to take place only when the rivet shank pierces with the rivet foot into the lower joining part. The joining parts are intended to have a tensile strength of greater than 500 N/mm$^2$ to up to 1500 N/mm$^2$. The tensile strength of the semi-tubular self-piercing rivet used is intended to lie within a range of between 1200 and 1400 N/mm$^2$, but can even reach values of up to 2000 N/mm$^2$.

In order to ensure a suitable expansion behaviour, the quotient from the axial depth of the shank cavity and the outside diameter of the rivet foot is to lie between 0.3 and 0.7. At too small an axial depth of the shank cavity, the rivet shank will not expand sufficiently after perforating the upper steel sheet.

A further semi-tubular self-piercing rivet is known from WO 2007/132194 A1. The shank here is to be provided with a central blind hole bore, wherein the ratio of a difference between an outside diameter and an inside diameter of the shank in the region of the bore to the outside diameter of the shank is intended to lie within the range of 0.47 to 0.52.

Furthermore, EP 2 314 890 A2 discloses a semi-tubular self-piercing rivet for connecting high-strength and super-high-strength steels, wherein a head diameter is generally smaller than or equal to 1.3 times the shank diameter.

However, as before, prior-art self-piercing riveted joints, with which high-strength or super-high-strength steels are connected, may have diverse problems. Firstly, the extent of the expansion may not be symmetrical with respect to a rivet axis. Furthermore, the shank may be compressed and twisted. In some cases, it is not even possible to press the rivet into the workpiece arrangement, with it even being possible for the self-piercing rivet to be fractured.

BRIEF SUMMARY OF THE INVENTION

Against this background, it is an object of the invention to specify an improved self-piercing rivet, an improved self-piercing riveted joint and an improved self-piercing riveting method, which are suitable for connecting high-strength and super-high-strength steels.

This object is achieved in the case of the self-piercing rivet referred to at the beginning in that the ratio of axial depth of the recess to shank diameter is smaller than 0.3, in particular smaller than 0.28, and particularly preferably smaller than 0.25, or even smaller than 0.2.

The ratio of axial depth of the recess to shank diameter is preferably greater than 0.05, and preferably greater than 0.1, and in particular greater than 0.12.

Furthermore, the above object is achieved by a self-piercing riveted joint with an upper workpiece and with a lower workpiece, of which at least one is formed from a high-strength steel, and with a deformed self-piercing rivet, the head of which bears against the upper workpiece, wherein the self-piercing rivet is in particular a self-piercing rivet according to the invention.

Finally, the above object is achieved by a method for producing a self-piercing riveted joint, in particular a self-piercing riveted joint of the type referred to above, with the steps of providing a workpiece arrangement which has at least one upper and one lower workpiece, and of driving a self-piercing rivet of the type according to the invention into the workpiece arrangement with a punching force.

By means of the configuration according to the invention of the self-piercing rivet, a deformation of the self-piercing rivet that is less focussed on an expansion of the rivet shank is produced during the self-piercing riveting method. Rather, the effect achieved by the relatively short axial depth of the recess is that the connection is formed by an upsetting operation of the rivet, said upsetting operation being caused in particular by the counter pressure of the high-strength steel of the workpiece arrangement. The undercut which is thereby formed can be relatively small in this case. However, owing to the high-strength materials, even a relatively small undercut is sufficient in order to realize the required connection strength.

In addition, the effect achieved by the relatively small axial depth of the recess is that the self-piercing rivet obtains a significantly greater stability which makes it possible to pierce through even high-strength and super-high-strength steels.

A contribution to the new manner of producing self-piercing riveted joints is provided by the flat surface section at the foot end. In other words, it is preferred if the generally annular end side of the foot end, which end side is also referred to as a cutting edge, is of at least proportionally flat design, specifically is preferably oriented perpendicularly to a longitudinal axis of the self-piercing rivet.

The upper workpiece of the workpiece arrangement is preferably produced from steel and has a tensile strength which is preferably greater than 800 N/mm$^2$, in particular greater than 1000 N/mm$^2$. The tensile strengths at least of the upper workpiece can be up to 1500 N/mm$^2$ and beyond.

The tensile strength of the lower workpiece—without heating—is preferably limited to approximately 600 N/mm$^2$.

In other words, even forming steels, such as are known under the name "Usibor®", in which, before a heat treatment, the microstructure consists in particular of a ferritic—pearlitic structure, can be joined with the required connection strength by the self-piercing rivet according to the invention.

It goes without saying that the strength or hardness of the self-piercing rivet is correspondingly adapted. Furthermore, it goes without saying that the self-piercing rivet is a semi-tubular self-piercing rivet which is produced in particular rotationally symmetrically and/or as a single piece from steel.

A small radius of 0.5 mm or less is preferably provided at the transition from the shank to the head in order to keep the setting forces as small as possible.

The minimum rivet length is preferably the thickness of the upper workpiece plus a length which is preferably greater than 2 mm and in particular equal to 3 mm. The maximum rivet length preferably lies within the range of the thickness of the workpiece arrangement.

The object is therefore completely achieved.

It is particularly preferred if the recess is frustoconical in longitudinal section.

In this alternative, the diameter of the recess in the region of the foot end is preferably greater than the diameter in the region of a base of the recess. In this embodiment, the base of the recess is preferably flat, but can also be curved concavely or convexly.

According to a further preferred embodiment, the recess is arch-shaped in longitudinal section.

The arch shape here can be produced by a single radius, and therefore the recess is in the shape of an arc of a circle in longitudinal section.

However, it is particularly preferred if the recess is in the shape of a pointed arch or a gothic arch in longitudinal section.

Such an arch shape is produced by two arcs constructed from circles and having a point.

It is preferred here if the point is rounded by means of a radius in a suitable manner.

Furthermore, it is preferred in the case of the pointed arch shape if the center points of the respective arcs, as the respectively assigned arch, each lie on different sides—as seen in longitudinal section—of a longitudinal center axis of the self-piercing rivet.

In the two embodiments referred to above—frustoconical or arch-shaped, it is advantageous for the punching forces acting from the head end to be suitably introduced into the foot end.

Overall, it is furthermore preferred if the recess does not have a cylindrical section.

A cylindrical section in the recess can result in instability and possibly in fracturing at very high punching pressures.

The stability of the self-piercing rivet can be increased overall by omitting a cylindrical section within the recess.

According to a further embodiment which, in conjunction with the precharacterizing clause of claim 1, constitutes a separate invention, the recess has a recess volume, wherein a ratio of recess volume to volume of the shank is smaller than 0.25, in particular smaller than 0.18 and/or is greater than 0.05, in particular greater than 0.1.

The recess volume in this case is calculated starting from the foot end of the self-piercing rivet. The volume of the shank is that volume of the shank at which the shank has a uniform outside diameter, i.e. exclusively a possible transition section to a head of the self-piercing rivet, but including the recess volume which is consequently contained in the volume of the shank.

The relatively small recess volume results, firstly, in great stability of the self-piercing rivet. Secondly, a punched-out piece detached from the upper workpiece is not received by the recess, but rather is pressed in front of the rivet by the rivet during the punching operation. The effect which can advantageously be achieved by this means is that greater deformation of material takes place within a die of a self-piercing riveting tool instead of deformation in the recess.

According to a further preferred embodiment, the flat surface section is designed as an annular surface section and has a radial width in cross section, wherein the ratio of radial width of the annular surface section to shank diameter is greater than 0.05 and/or is smaller than 0.25.

The self-piercing rivet is preferably produced from a steel with a hardness of at least 500 HV10 (1630 MPa), in particular with a hardness of at least 650 HV10, in particular with at least 700 HV10. The hardness is generally smaller than 800 HV10.

In the self-piercing riveted joint according to the invention, it is preferred if the axial thickness of the upper workpiece is greater than or equal to the axial depth of the recess in the undeformed state.

Furthermore, it is advantageous in the case of the self-piercing riveted connection according to the invention if a punched-out piece is detached from the upper workpiece, and if less than 50% of the volume of the punched-out piece is located within the deformed recess, in particular less than 30%, preferably less than 25% and particularly preferably less than 20%.

This results in the self-piercing rivet being designed in such a manner that it is substantially upset, as a result of which the volume of the recess is reduced, and therefore the punched-out piece is substantially pushed in front of the rivet during the self-piercing riveting operation.

Material of the lower workpiece can thereby be suitably displaced within the die by means of the punched-out piece, and therefore said material flows behind an undercut in the shank of the self-piercing rivet.

All in all, it is furthermore advantageous if the shank of the deformed self-piercing rivet forms an undercut in relation to forces in the direction of the head, wherein the ratio of undercut to shank diameter is smaller than 0.1 and/or is greater than 0.01.

This results in the extent of the undercut being comparatively small. However, such a small undercut is sufficient when connecting high-strength steels in order to realize the necessary connection strength.

According to a further preferred embodiment of the self-piercing riveted joint, the ratio of axial length of the self-piercing rivet after deformation and of axial length of the self-piercing rivet before deformation is greater than 0.8 and/or is smaller than 0.95.

This results in the self-piercing rivet only being upset to a comparatively small extent because of the predetermined hardness thereof, which likewise leads to a relatively small undercut in the radial direction.

This also results in the minimum length of the self-piercing rivet preferably being produced from the thickness of the upper workpiece plus a value of preferably 3 or 3.5 mm, whereas the maximum length of the self-piercing rivet is preferably calculated by the overall thickness of the workpiece arrangement plus 1 mm or is equal to the overall thickness of the workpiece arrangement.

In the case of the method according to the invention it is advantageous if the workpiece arrangement is supported on a die with a die volume into which at least the lower workpiece is driven, wherein the ratio of die volume to a volume of the self-piercing rivet is greater than or equal to 1.0 and/or is smaller than or equal to 1.5.

The die volume is the volume into which material at least of the lower workpiece flows during the self-piercing riveting operation, wherein the upper edge of the die recess provided for this purpose is substantially flush with a supporting surface. The shape of the die recess here is preferably frustoconical, with a relatively large diameter in the region of the supporting surface and a smaller diameter in the region of a base of the die volume.

Overall, the following can furthermore be noted in addition. In the case of conventional self-piercing riveting, the formation of the undercut is a feature which is relevant to the quality of the connection strength. Owing to the high strength of the rivet according to the invention, this feature no longer holds true by itself. The rivet requires a relatively strong upper workpiece, the punched-out piece of which then upsets the rivet and presses it somewhat apart in the process. In contrast to rivets from the prior art, the undercut in the connection is not produced by conventional expansion, but rather is produced by an upsetting operation of the rivet, the upsetting operation being caused by the counter pressure of the high-strength steel. A further differentiation criterion with respect to conventional rivets is the range of use which, as a rule, begins only at a tensile strength of the upper workpiece of 800 N/mm², in particular of 1000 N/mm². Steels of this strength category have found use in vehicle manufacturing because of the increased use of lightweight structures made from super-high-strength sheets. The range of use of the self-piercing rivet according to the invention downwards is preferably limited by a minimum punching force—the force for perforating/piercing the high-strength workpiece arrangement—of 8 kN. Above said force, a sufficient upsetting (not primarily spreading) of the self-piercing rivet begins, and the required degree of upset, which is preferably at least 0.15 mm, is achieved. In order to assess the connection quality, the degree of upset should also be taken into consideration in addition to the formation of an undercut. The degree of upset is calculated from the axial length of the self-piercing rivet before deformation minus the axial length of the self-piercing rivet after deformation, i.e. in the settled state.

It goes without saying that the features referred to above and those which have yet to be explained below are usable not only in the respectively stated combination, but also in different combinations or on their own without departing from the scope of the present invention.

BRIEF DESCRIPTION OF THE DRAWINGS

Exemplary embodiments of the invention are illustrated in the drawing and are explained in more detail in the description below. In the drawing:

FIG. 1 shows a longitudinal sectional view through an embodiment of a self-piercing rivet according to the invention;

FIG. 2 shows a longitudinal sectional view through a further embodiment of a self-piercing rivet according to the invention.

DETAILED DESCRIPTION OF THE PREFERRED EMBODIMENTS

Figure 3:
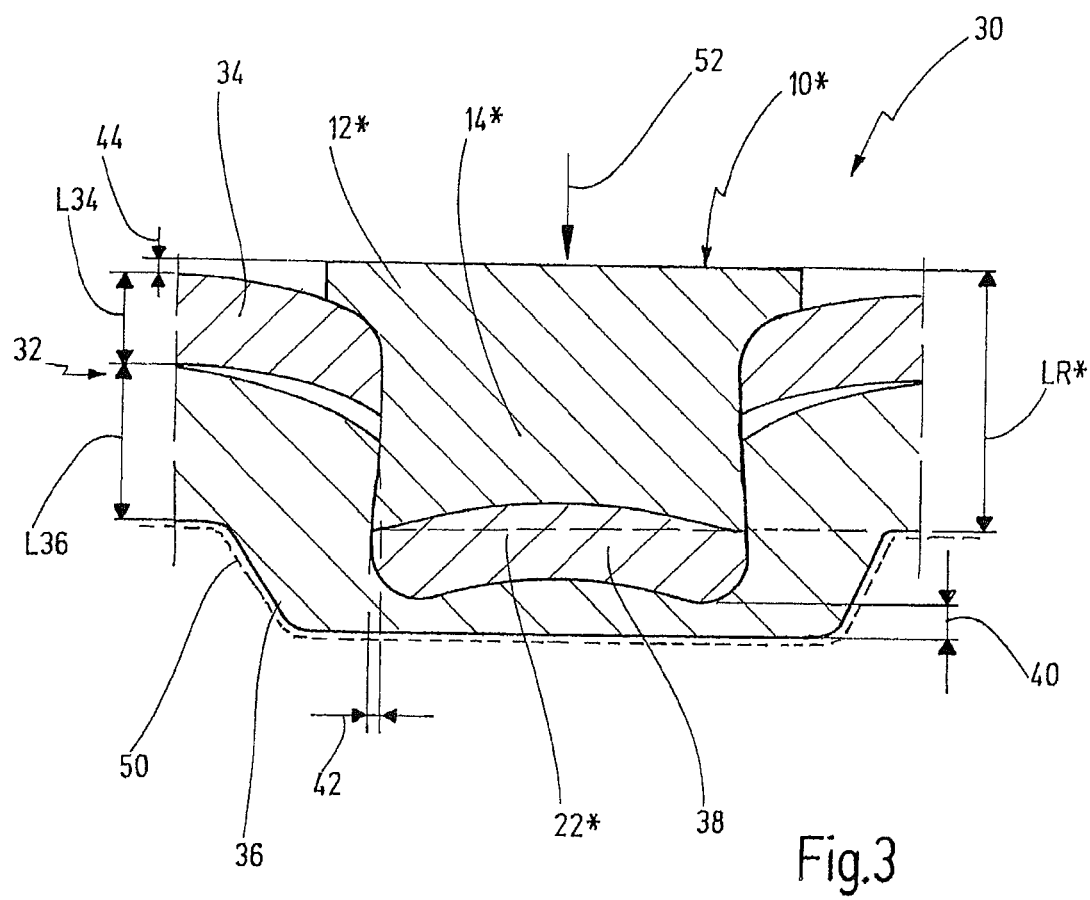
FIG. 3 shows a longitudinal sectional view through a self-piercing riveted joint produced by means of the self-piercing rivet of FIG. 1.

A rotationally symmetrical semi-tubular self-piercing rivet is illustrated schematically in longitudinal section and denoted in general by 10 in FIG. 1.

The self-piercing rivet 10 is produced from a strong steel and preferably has a hardness of greater than 500 HV. The self-piercing rivet is in particular produced by pressure deformation.

The self-piercing rivet 10 has a head 12 and a shank 14 adjoining the latter in the axial direction. The shank 14 merges into the head 12 via a transition section 16. An end of the shank 14 that is opposite the head 12 is designed as a foot end 18 in FIG. 1.

A flat surface section 20 is formed at the foot end 18, said surface section being designed as an annular surface section, the outside diameter of which is limited by an outside diameter of the shank 14 and the inside diameter of which is limited by an edge of a recess 22 which extends from the foot end 18 in the direction of the head 12.

In FIG. 1, the recess 22 is of frustoconical design and, starting from the foot end 18, has a conically extending recess transition section 24 and a recess base 26. The recess base 26 can be of flat design, as illustrated, but may also be of concave or convex design.

Furthermore, the following dimensions are shown in FIG. 1, wherein the preferred values for said dimension are in each case also plotted in the table below:

| Designation | Abbreviation | Preferred value | Note |
| --- | --- | --- | --- |
| Axial length, self-piercing rivet | LR | 5 mm | |
| Length, shank | LS | 3.6 mm | |
| Axial height, head | LH | 0.5 mm | |
| Axial depth, recess | LB | 1 mm | |
| Diameter, head | DH | 7.75 mm | |
| Outside diameter, shank | DS | 5.5 mm | |
| Recess diameter at the foot end | DB | 4.5 mm | |
| Recess diameter at the base | DB' | ~2.5 mm | |
| Radial width, annular surface Section | BF | 0.5 mm | |
| Cone angle, recess | $\alpha B$ | ~40° | i.e. 25°-50° |
| Cone angle, transition section | $\alpha H$ | ~27° | i.e. 20°-50° |

In the case of the self-piercing rivet of FIG. 1, the ratio of axial depth LB of the recess 22 to the shank diameter DS is approximately 0.18.

The ratio of radial width BF to the shank diameter DS is approximately 0.09.

Furthermore, the ratio of the recess volume to the volume of the shank is approximately 0.135, wherein the volume of the recess is approximately calculated at $$VB=(LB\cdot\pi)/3\cdot[(DB/2)^2+DB\cdot DB'+(DB'/2)^2],$$

and wherein the volume of the shank is calculated at $$VS=\pi\cdot(DS/2)^2\cdot LS$$

The volume VS of the shank consequently includes the recess volume VB.

The values, which are indicated in the table above, for the respective dimensions and angles can preferably each deviate within the scope of the invention upwards and downwards by at least 20%, preferably upwards and downwards by 10% in each case.

A radius RB which is formed at the transition between the recess transition section 24 and the recess base 26 is furthermore shown in FIG. 1. The value of RB can be, for example, 0.35 mm. The value of DB' is an approximate value which lies approximately in the center of the recess RB, as seen in the radial direction.

Furthermore, a radius RH which forms the transition between the conical transition section 16 and the shank 14 is shown in FIG. 1. The value of RH can be, for example, 0.5 mm or less.

An alternative embodiment of a self-piercing rivet according to the invention is illustrated in FIG. 2 and is likewise generally denoted by 10. The self-piercing rivet 10 of FIG. 2 corresponds generally in respect of construction and function to the self-piercing rivet 10 of FIG. 1. Identical elements are therefore indicated by the same reference numbers. Essentially the differences are explained below.

The recess 22 of the self-piercing rivet 10 of FIG. 2 is not frustoconical, as in the case of the self-piercing rivet 10 of FIG. 1, but rather is of arch-shaped design. In more precise terms, the recess 22 in FIG. 2 is in the shape of a pointed arch in longitudinal section, the pointed arch being assembled from two arcs of a circle which form a point on the longitudinal axis. The origins of the arcs of the circle lie in each case on that side of the longitudinal axis which is opposite the arc of the circle thereof. In the region of the point which is formed by the two arcs of the circle, the recess is rounded with a radius which can be, for example, 0.5 mm. This radius is indicated schematically in FIG. 2 by R1.

The radius of the two arcs of the circle is indicated schematically in FIG. 2 by R2 and can be, for example, approximately 4 mm.

In the case of the self-piercing rivet 10 of FIG. 2, the maximum axial depth LB of the recess 22 is preferably approximately 1.5 mm, and therefore a ratio LB/DS of approximately 0.273 is produced.

The shank diameter DS and the shank axial length LS and also other dimensions can be identical to those of the self-piercing rivet 10 of FIG. 1.

A self-piercing riveted joint 30 produced by means of the self-piercing rivet 10 of FIG. 1 is illustrated schematically in longitudinal section and is denoted in general by 30 in FIG. 3.

The self-piercing rivet joint 30 connects a workpiece arrangement 32 which contains at least one upper workpiece 34 and one lower workpiece 36, of which at least the upper workpiece can be produced in the form of steel sheet from high-strength or super-high-strength steels.

It is illustrated in FIG. 3 that the self-piercing rivet 10* has cut a punched-out piece 38 out of the upper workpiece 34 and has pressed said punched-out piece in front of itself during the self-piercing riveting operation. The remaining base thickness between the lower side of the punched-out piece and the lower side of the lower workpiece 36 is denoted by 40. This may be, for example, greater than 0.5 mm.

Furthermore, a radial undercut of the deformed shank 14* is shown in FIG. 3. The self-piercing rivet 10* has been upset, in particular in the region of the foot end, because of the relatively hard material of the upper workpiece 34, and therefore the material of said self-piercing rivet has flowed somewhat outwards radially in the region of the foot end. Owing to the great hardness of the self-piercing rivet 10* too, the undercut 42 is nevertheless very small and may be, for example, smaller than 0.5 mm, but is, as a rule, greater than 0.05 mm. Correspondingly, the ratio of undercut 42 to shank diameter DS is preferably within a range of 0.1 to 0.01.

Finally, FIG. 3 shows a projecting length 44 by which the head 12* protrudes in relation to the upper side of the upper workpiece 34. The projecting length 44 is preferably smaller than the axial height LH of the self-piercing rivet 10 in the undeformed state.

Furthermore, FIG. 3 shows the axial length LR* of the deformed self-piercing rivet 10*. In the example illustrated, said length can be, for example, approximately 4.4 mm. The ratio of axial length LR* of the self-piercing rivet 10* after deformation and axial length LR of the self-piercing rivet 10 before deformation is preferably greater than 0.8 and/or smaller than 0.95.

As stated, the self-piercing rivet 10* has been upset in the region of the foot end, and therefore the remaining volume of the remaining recess 22* is relatively small. Accordingly, in the embodiment illustrated, at most a portion of 50%, in particular at most a portion of 25%, of the volume of the punched-out piece 38 is accommodated within the deformed recess 22*.

The axial thickness of the upper workpiece 34 is denoted by L34. Said thickness can be greater than or equal to the axial depth LB of the self-piercing rivet 10 in the undeformed state. The axial thickness of the lower workpiece 36 is denoted by L36. Said thickness is preferably greater than L34. The lower workpiece 36 is preferably softer than the upper workpiece 34.

FIG. 3 furthermore schematically illustrates a die 50 of a self-piercing riveting tool, by means of which an axial force (punching force) 52 is exerted on the upper side of the head 12 of the self-piercing rivet 10 during the self-piercing riveting operation. The recess of the die 50 is of approximately frustoconical design. The somewhat softer material of the second workpiece 34 is pressed away radially by the punched-out piece 38 and the die 50 and in this case flows behind the undercut 42 such that the self-piercing riveted joint 30 provides an interlocking connection between the workpieces 34, 36.

The volume of the die recess is preferably greater than or equal to the volume of the self-piercing rivet 10 in the undeformed state. In particular, the ratio of the die volume to the volume of the self-piercing rivet 10 is preferably greater than or equal to 1.0 and/or smaller than or equal to 1.5.

The minimum punching force 52 is preferably 8 kN.

The minimum length of the self-piercing rivet 10 in the undeformed state is produced form the thickness L34 plus a value which can be, for example, 3 or 3.5 mm. The maximum length of the self-piercing rivet 10 in the undeformed state can be equal to the overall thickness L34+L36, or a value which is formed to be equal to the overall sheet thickness+a value of, for example, 1 mm.

The upper workpiece 34 preferably has a tensile strength in the region of greater than 800 N/mm², in particular greater than 1000 N/mm². The lower workpiece 36 preferably has a tensile strength of smaller than 600 N/mm². The self-piercing rivet 10 preferably has a (Vickers) hardness of more than 650 HV.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A self-piercing riveted joint comprising:
   a first workpiece and a second workpiece, of which at least one is formed from a high-strength steel, wherein the first workpiece has a first side and a second side, and wherein the second workpiece is located against the second side of the first workpiece; and
   a self-piercing rivet which in an undeformed state, before the creation of the riveted joint, included:
   a head defining a head diameter (DH);
   a shank defining a shank diameter (DS) and including a foot end opposite the head; and
   an axial recess in the foot end of the shank, open axially away from the head, the axial recess defining an axial depth (LB), wherein a ratio of axial depth (LB) of the recess to shank diameter (DS) is less than 0.3,
   wherein, after the creation of the riveted joint:
   the self-piercing rivet is in a deformed state in which the rivet extends through the first workpiece and penetrates the second workpiece,
   the head bears against the first surface of the first workpiece,
   an undercut is formed between a radially outwardly deformed portion of the shank and the second workpiece, and
   the rivet contacts the second workpiece.

2. The self-piercing riveted joint according to claim 1, wherein the axial thickness (L34) of the first workpiece is at least equal to the axial depth (LB) of the self-piercing rivet's axial recess in the undeformed state.

3. The self-piercing riveted joint according to claim 1, wherein a punched-out piece is detached from the first workpiece (34).

4. The self-piercing riveted joint according to claim 1, wherein a punched-out piece is detached from the first workpiece (34), and less than 25% of the volume of the punched-out piece is located within the axial recess of the self-piercing rivet in the deformed state.

5. The self-piercing riveted joint according to claim 1, wherein the shank of the self-piercing rivet in the deformed state forms the undercut in relation to forces in the direction of the head, and the ratio of undercut (42) to shank diameter (DS) is greater than 0.01.

6. The self-piercing riveted joint according to claim 1, wherein the ratio of the axial length (LR*) of the self-piercing rivet in the deformed state and the axial length (LR) of the self-piercing rivet in the undeformed state is at least one of greater than 0.8 or smaller than 0.95.

7. The self-piercing riveted joint according to claim 1, wherein, in the undeformed state:
   the foot end of the shank includes a flat surface section facing axially away from the head,
   the axial recess is located radially inward of the flat surface section,
   the flat surface section is annular and has a radial width, and
   a ratio of the radial width of the annular surface section to the shank diameter is greater than 0.05.

8. The self-piercing riveted joint according to claim 1, wherein the ratio of the axial depth (LB) to the shank diameter (DS) is less than 0.25.

9. The self-piercing riveted joint according to claim 1, wherein the ratio of the axial depth (LB) to the shank diameter (DS) is less than 0.2.

10. The self-piercing riveted joint according to claim 9, wherein the ratio of the axial depth (LB) to the shank diameter (DS) is greater than 0.1.

11. The self-piercing riveted joint according to claim 1, wherein, in the deformed state, the rivet penetrates only part way through the second workpiece such that the rivet does not pierce the second workpiece.

12. The self-piercing riveted joint according to claim 1, wherein the undercut is greater than 0.05 mm.

13. The self-piercing riveted joint according to claim 1, wherein a ratio of the undercut to the shank diameter (DS) is within a range of 0.01 to 0.1.

14. The self-piercing riveted joint according to claim 1, wherein the rivet contacts the second workpiece where the deformed portion of the shank undercuts the second workpiece.

15. The self-piercing riveted joint according to claim 1, wherein the first workpiece comprises steel and has a tensile strength greater than 1000 N/mm2.

16. The self-piercing riveted joint according to claim 1, wherein the first workpiece comprises steel and has a tensile strength of over 1500 N/mm2.

17. The self-piercing riveted joint according to claim 1, wherein:
   the first workpiece comprises steel and has a tensile strength of over 800 N/mm2; and
   the second workpiece has a tensile strength of less than 600 N/mm2.

18. The self-piercing riveted joint according to claim 1, wherein, in the deformed state:
   the rivet contacts the second workpiece where the deformed shank undercuts the second workpiece; and
   said undercut is sufficient to produce a fastening action between the first and second workpieces.

* * * * *